(12) United States Patent
Chan

(10) Patent No.: US 11,134,107 B2
(45) Date of Patent: Sep. 28, 2021

(54) THIRD-PARTY SYSTEM FOR CONTROLLING CONFERENCE EQUIPMENT

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 65 days.

(21) Appl. No.: 16/231,837

(22) Filed: Dec. 24, 2018

(65) Prior Publication Data

US 2020/0021625 A1 Jan. 16, 2020

(30) Foreign Application Priority Data

Jul. 10, 2018 (TW) .................................. 107123794

(51) Int. Cl.
| | | |
|---|---|---|
| *H04L 29/06* | (2006.01) | |
| *H04N 7/15* | (2006.01) | |
| *G06F 9/54* | (2006.01) | |
| *H04L 12/18* | (2006.01) | |

(52) U.S. Cl.
CPC ............ *H04L 65/1069* (2013.01); *G06F 9/54* (2013.01); *H04L 12/1813* (2013.01); *H04L 65/1083* (2013.01); *H04N 7/152* (2013.01)

(58) Field of Classification Search
CPC ............. H04L 12/2818; H04L 12/2809; H04L 12/2816; H04L 69/08; H04L 65/1069; H04L 65/1083; H04L 12/1813; H04L 12/1822; H04L 65/403; G06F 15/16; G06F 3/0416; G06F 3/0346; G06F 9/54; H04N 7/152; H04N 7/147; H04N 2007/145
USPC .......................................... 370/474; 709/204
See application file for complete search history.

(56) References Cited

U.S. PATENT DOCUMENTS

| | | | | |
|---|---|---|---|---|
| 2010/0046553 | A1* | 2/2010 | Daigle | .................... H04L 69/22 |
| | | | | 370/474 |
| 2011/0205178 | A1* | 8/2011 | Yoshida | ................ G06F 1/1692 |
| | | | | 345/173 |
| 2012/0039457 | A1 | 2/2012 | Liao | |
| 2012/0105571 | A1* | 5/2012 | Li | ........................ H04L 12/1822 |
| | | | | 348/14.02 |
| 2012/0316884 | A1* | 12/2012 | Rozaieski | ................ A61G 5/10 |
| | | | | 704/275 |
| 2013/0263235 | A1 | 10/2013 | Daigle | |

(Continued)

FOREIGN PATENT DOCUMENTS

| | | |
|---|---|---|
| CN | 102843355 A | 12/2012 |
| CN | 106789914 A | 5/2017 |

*Primary Examiner* — Tesfay Yohannes
(74) *Attorney, Agent, or Firm* — Muncy, Geissler, Olds & Lowe, P.C.

(57) ABSTRACT

A third-party system for controlling conference equipment includes at least one conference device, at least one server, and at least one host device. The conference device, arranged in a physical room, corresponds to at least one recognition datum, and the recognition datum corresponds to the physical position of the physical room. The server, signally connected to the conference device, stores the recognition datum. The host device, wirelessly connected to the server, stores the recognition datum. The host device has at least one first control APP program built therein, and the first control APP program corresponds to the server. The host device uses the first control APP program and the recognition datum to control the conference device through the server during at least one given period.

11 Claims, 4 Drawing Sheets

(56) References Cited

U.S. PATENT DOCUMENTS

| | | | |
|---|---|---|---|
| 2015/0199738 A1* | 7/2015 | Jung | G06Q 30/0609 705/26.35 |
| 2015/0213355 A1* | 7/2015 | Sharma | G06F 3/167 706/11 |
| 2015/0319563 A1* | 11/2015 | Johnson | H04W 4/02 455/456.3 |
| 2017/0064014 A1* | 3/2017 | Nomura | A63F 13/73 |
| 2017/0201850 A1* | 7/2017 | Raleigh | G06F 3/0482 |
| 2018/0039951 A1* | 2/2018 | Wynn | H04N 7/15 |
| 2018/0089420 A1* | 3/2018 | Daube | G06F 21/50 |
| 2018/0183278 A1* | 6/2018 | Chu | H02J 50/80 |
| 2018/0302443 A1* | 10/2018 | Weiss | G06F 21/604 |
| 2018/0335775 A1* | 11/2018 | Konishi | G05D 1/0066 |
| 2019/0019162 A1* | 1/2019 | Yang | H04N 7/155 |

\* cited by examiner

THIRD-PARTY SYSTEM FOR CONTROLLING CONFERENCE EQUIPMENT

This application claims priority for Taiwan patent application no. 107123794 filed on Jul. 10, 2018, the content of which is incorporated by reference in its entirety.

BACKGROUND OF THE INVENTION

Field of the Invention

The present invention relates to a system for controlling conference equipment, particularly to a third-party system for controlling conference equipment.

Description of the Related Art

Many companies have conference rooms. Participants cluster in the conference room and hold a meeting. The conference rooms are provided with control units having different functions. Participants or a presenter uses the control unit to control equipment or assemblies in the conference room, such as telephones, projectors, or projected screens. The control unit may provide a function that a user controls an environmental condition of the conference room. For example, a user uses the control unit to brighten or darken the conference room.

When a meeting is in progress, different equipment, including those of telephone communication systems, presentation systems, video systems, televisions, and projective equipment, is used to cooperate with operations related to the meeting. All the devices are driven by corresponding control units or manually driven. When a meeting starts or is in progress, different control units are used to manage or drive corresponding equipment, so as to satisfy requirements for the meeting. According to different types of meetings, different equipment may be used. Different equipment and a computer may cooperatively be used. Alternatively, different equipment is preset by many people. Or otherwise, different equipment performs operations related to the instruction of a presenter. However, when a presenter intends to hold a meeting at a preset time point, the presenter may not enter into a conference room, or cannot approach and control conference equipment.

To overcome the abovementioned problems, the present invention provides a third-party system for controlling conference equipment, so as to solve the afore-mentioned problems of the prior art.

SUMMARY OF THE INVENTION

The primary objective of the present invention is to provide a third-party system for controlling conference equipment, which uses a host device to wirelessly control a conference device, such that a meeting is successfully held or terminated on time.

To achieve the abovementioned objectives, the present invention provides a third-party system for controlling conference equipment, which comprises at least one conference device. The conference device, arranged in a physical room, corresponds to at least one recognition datum, and the at least one recognition datum corresponds to a physical position of the physical room; at least one server, signally connected to the at least one conference device, storing the at least one recognition datum; and at least one host device, wirelessly connected to the at least one server, storing the at least one recognition datum and having at least one first control application program (first control APP program) built therein, the at least one first control APP program corresponds to the at least one server, and the at least one host device uses the at least one first control APP program and the at least one recognition datum to control the at least one conference device through the at least one server during at least one given period.

In an embodiment of the present invention, the at least one conference device is a webcam, a liquid crystal display, or an Internet protocol phone.

In an embodiment of the present invention, the at least one recognition datum further comprises at least one of a telephone number, an Internet protocol address, a password, a recognition code, and a device name.

In an embodiment of the present invention, after the at least one host device uses the at least one first control APP program to send out an operating command to the at least one server, the at least one server transmits an operating signal to the at least one conference device according to the operating command, and the at least one conference device passively responds to the operating signal.

In an embodiment of the present invention, the at least one conference device further comprises a plurality of conference devices, the at least one server has an instruction set for controlling the plurality of conference devices, the instruction set comprises a plurality of operation commands respectively correspond to the plurality of conference devices, after the at least one host device uses the at least one first control APP program to send out a control command to the at least one server, the at least one server finds one of the plurality of operation commands corresponding to the control command from the instruction set and transmits it to a corresponding conference device of the plurality of conference devices, so as to control the corresponding conference device.

In an embodiment of the present invention, after the at least one server transmits one of the plurality of operation commands corresponding to the control command to the corresponding conference device to control the corresponding conference device, one of the plurality of conference devices corresponding to the control command uses the at least one server and the at least one first control APP program to transmit a status message to the at least one host device to inform the at least host one device of a status of one of the plurality of conference devices corresponding to the control command.

In an embodiment of the present invention, the at least one host device displays the status message.

In an embodiment of the present invention, the at least one first control APP program has at least one independent control interface or an integrated control interface.

In an embodiment of the present invention, the at least one host device uses the at least one first control APP program to set and upload the at least one given period to the at least one server.

In an embodiment of the present invention, the at least one server is connected to the at least one conference device in a wired way or a wireless way.

In an embodiment of the present invention, third-party system further comprises at least one client device wirelessly connected to the at least one server. The at least one client device has a second control application program (second control APP program) built therein corresponding to the at least one server, one of the at least one host device and the at least one client device executes the at least one first control APP program or the second control APP program, thereby using the at least one server to establish an on-line session that corresponds to a virtual number, and when the at least one server uses the virtual number to attend the on-line session and communicate with the at least one server during the at least one given period, the at least one server uses the at least one recognition datum to communicate with the at least one conference device and uses the at least one first control APP program to transmits a reminding message to the at least one host device.

In an embodiment of the present invention, the at least one host device and the at least one client device are selected from smart phones, tablet computers, or notebook computers.

In an embodiment of the present invention, the at least one server terminates authority that the at least one host device controls the at least one conference device when the at least one given period ends.

Below, the embodiments are described in detail in cooperation with the drawings to make easily understood the technical contents, characteristics and accomplishments of the present invention.

DETAILED DESCRIPTION OF THE INVENTION

Figure 1:
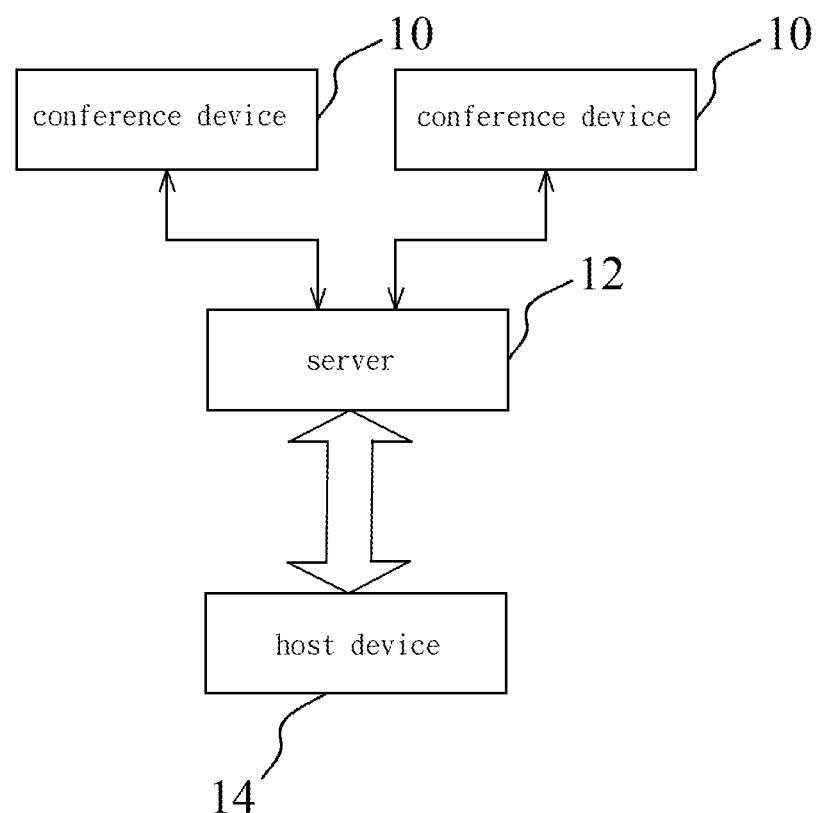
FIG. 1 is a diagram schematically showing a third-party system for controlling conference equipment according to the first embodiment of the present invention.

Refer to FIG. 1. The first embodiment of the third-party system for controlling conference equipment of the present invention is introduced as follows. The third-party system comprises at least one conference device 10, at least one server 12, and at least one host device 14. In the first embodiment, there are a plurality of conference devices 10, and the number of the host device 14 is one. For example, the conference device 10 may be a webcam, a liquid crystal display, or an Internet protocol phone. The host device 14 may be selected from a smart phone, a tablet computer, or a notebook computer. The conference devices 10 are arranged in a physical room, such as a conference room. The conference device 10 corresponds to at least one recognition datum. The recognition datum corresponds to the physical position of the physical room. Since there are a plurality of conference devices 10, there are a plurality of recognition data. The plurality of recognition data respectively correspond to the plurality of conference devices 10. The recognition data comprise at least one of a telephone number, an Internet protocol address, a password, a recognition code, and a device name. The server 12, signally connected to the conference devices, stores the recognition data. Specifically, the server 12 is connected to the conference devices 10 in a wired way or a wireless way. The host device 14 is wirelessly connected to the server 12. The host device 14 stores the recognition data. The host device 14 has at least one first control APP program built therein. For example, the number of the first control APP program is one. The first control APP program corresponds to the server 12. The first control APP program has at least one independent control interface or an integrated control interface. Since there are a plurality of conference devices 10, the first control APP program has a plurality of independent control interfaces or an integrated control interface, wherein the plurality of independent control interfaces respectively correspond to the plurality of conference devices 10. The host device 14 uses the first control APP program and the recognition data to control the conference devices 10 through the server 12 during at least one given period. For example, there are a plurality of periods, including those of daytime and nighttime. The host device 14 uses the first control APP program to set and upload the given period to the server 12. The server 12 terminates authority that the host device 14 controls the conference devices 10 when the given period ends, such that the host device 14 cannot control the conference devices 10 through the server 12. As a result, the host device 14 wirelessly controls the conference devices 10, whereby the meeting is successfully held on time.

Figure 2:
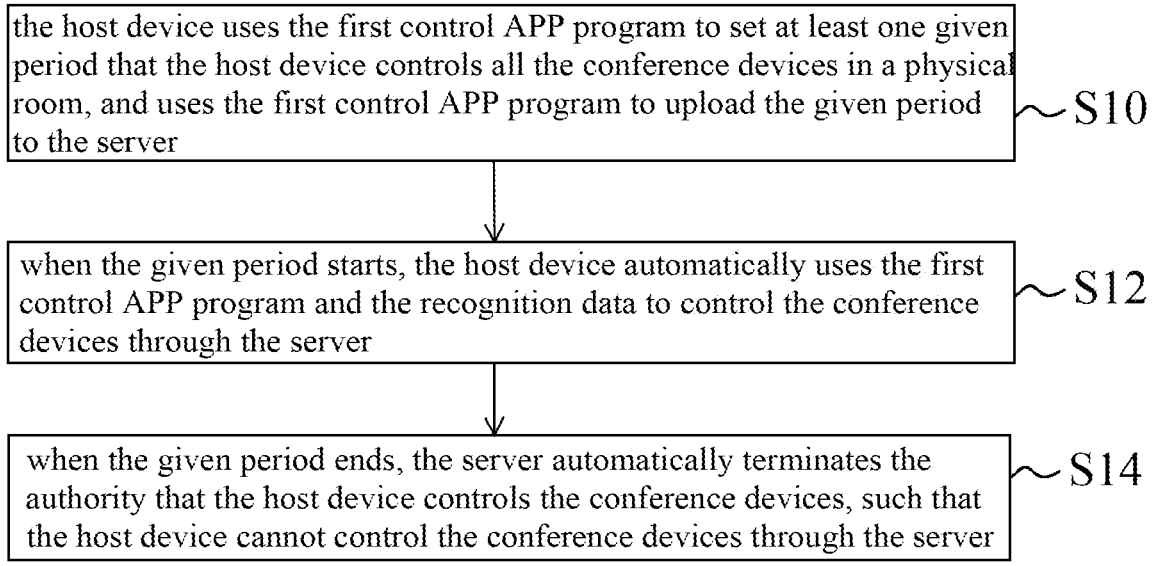
FIG. 2 is a flowchart of operating a third-party system for controlling conference equipment according to the first embodiment of the present invention.

Refer to FIG. 1 and FIG. 2. The flowchart of operating a third-party system for controlling conference equipment of the first embodiment of the present invention is introduced as follows. Firstly, in Step S10, the host device 14 uses the first control APP program to set at least one given period that the host device 14 controls all the conference devices 10 in a physical room, and uses the first control APP program to upload the given period to the server 12. Afterwards, in Step S12, when the given period starts, the host device 14 automatically uses the first control APP program and the recognition data to control the conference devices 10 through the server 12. Finally, in Step S14, when the given period ends, the server 12 automatically terminates the authority that the host device 14 controls the conference devices 10, such that the host device 14 cannot control the conference devices 10 through the server 12.

In Step S12, after the host device 14 uses the first control APP program to send out an operating command to the server 12, the server 12 transmits an operating signal to the conference device 10 according to the operating command, and the conference device 10 passively responds to the operating signal. In fact, the conference device 10 does not use the operating signal to drive any device. For example, the conference 10 is an Internet protocol phone with an automatic answer function. When a caller calls the Internet protocol phone, the host device 14 uses the first control APP program to send out an operating command to the server 12. Afterwards, the server 12 performs an operation corresponding to the operating command, such as a telephone-answering operation for answering a telephone call of the caller. After the server 12 combines the audio signal of the caller, the server 12 generates and transmits audio data as the operating signal to the Internet protocol phone, such that the Internet protocol phone generates the audio signal of the caller to passively respond the operating signal. Besides, the server 12 has an instruction set for controlling the plurality of conference devices 10, the instruction set comprises a plurality of operation commands respectively correspond to the plurality of conference devices 10. After the host device 14 uses the first control APP program to send out a control command to the server 12, the server 12 finds one of the plurality of operation commands corresponding to the control command from the instruction set and transmits it to a corresponding conference device 10 of the plurality of conference devices 10, so as to control the corresponding conference device 10. After the server 12 transmits one of the plurality of operation commands corresponding to the control command to the corresponding conference device 10 to control the corresponding conference device 10, one of the plurality of conference devices 10 corresponding to the control command uses the server 12 and the first control APP program to transmit a status message to the host device 14 to inform the host device 14 of the status of one of the plurality of conference devices 10 corresponding to the control command Simultaneously, the host device 14 displays the status message that is provided to a user of the host device 14 for seeing.

Figure 3:
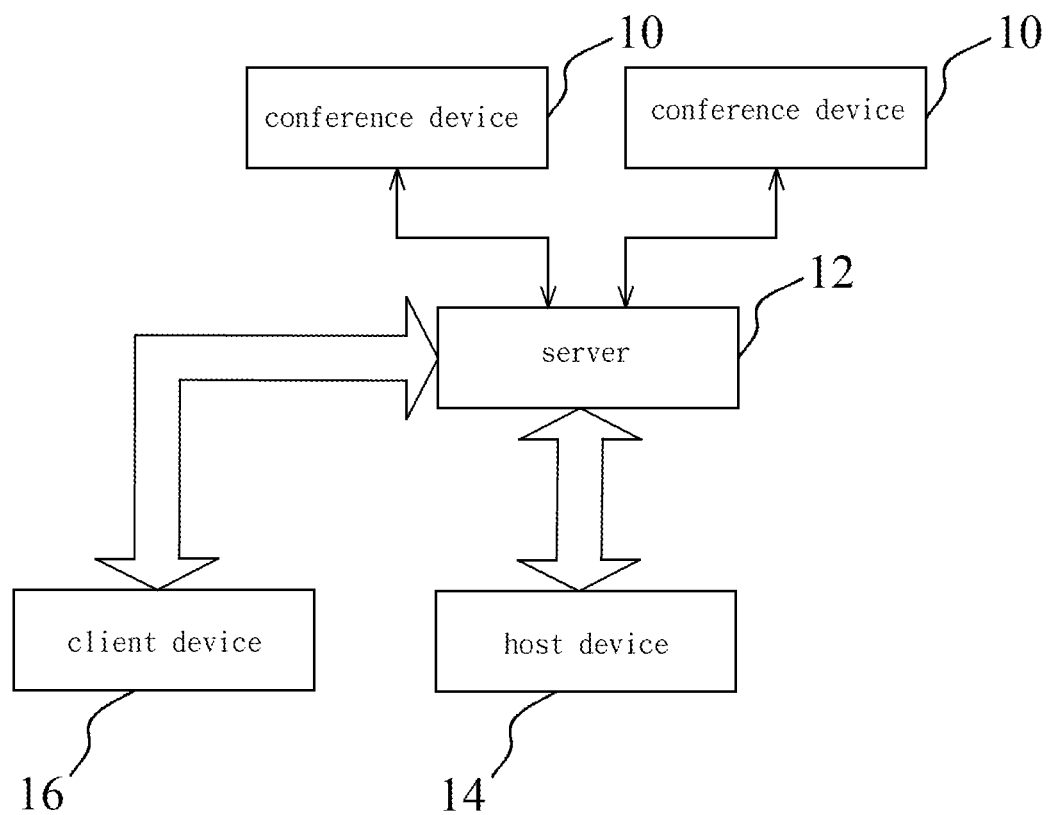
FIG. 3 is a diagram schematically showing a third-party system for controlling conference equipment according to the second embodiment of the present invention.

Refer to FIG. 3. The second embodiment of the third-party system for controlling conference equipment of the present invention is introduced as follows. The second embodiment is different from the first embodiment in that the second embodiment further comprises at least one client device 16 wirelessly connected to the server 12, wherein the client device 16 is selected from a smart phone, a tablet computer, or a notebook computer. The client device 16 has a second control APP program built therein corresponding to the server 12. One of the host device 14 and the client device 16 executes the first control APP program or the second control APP program, thereby using the server 12 to establish an on-line session that corresponds to a virtual number. When the server 12 uses the virtual number to attend the on-line session and communicate with the server 12 during the given period, the server 12 uses the recognition data to communicate with the conference devices 10 and uses the first control APP program to transmits a reminding message to the host device 14.

Figure 4:
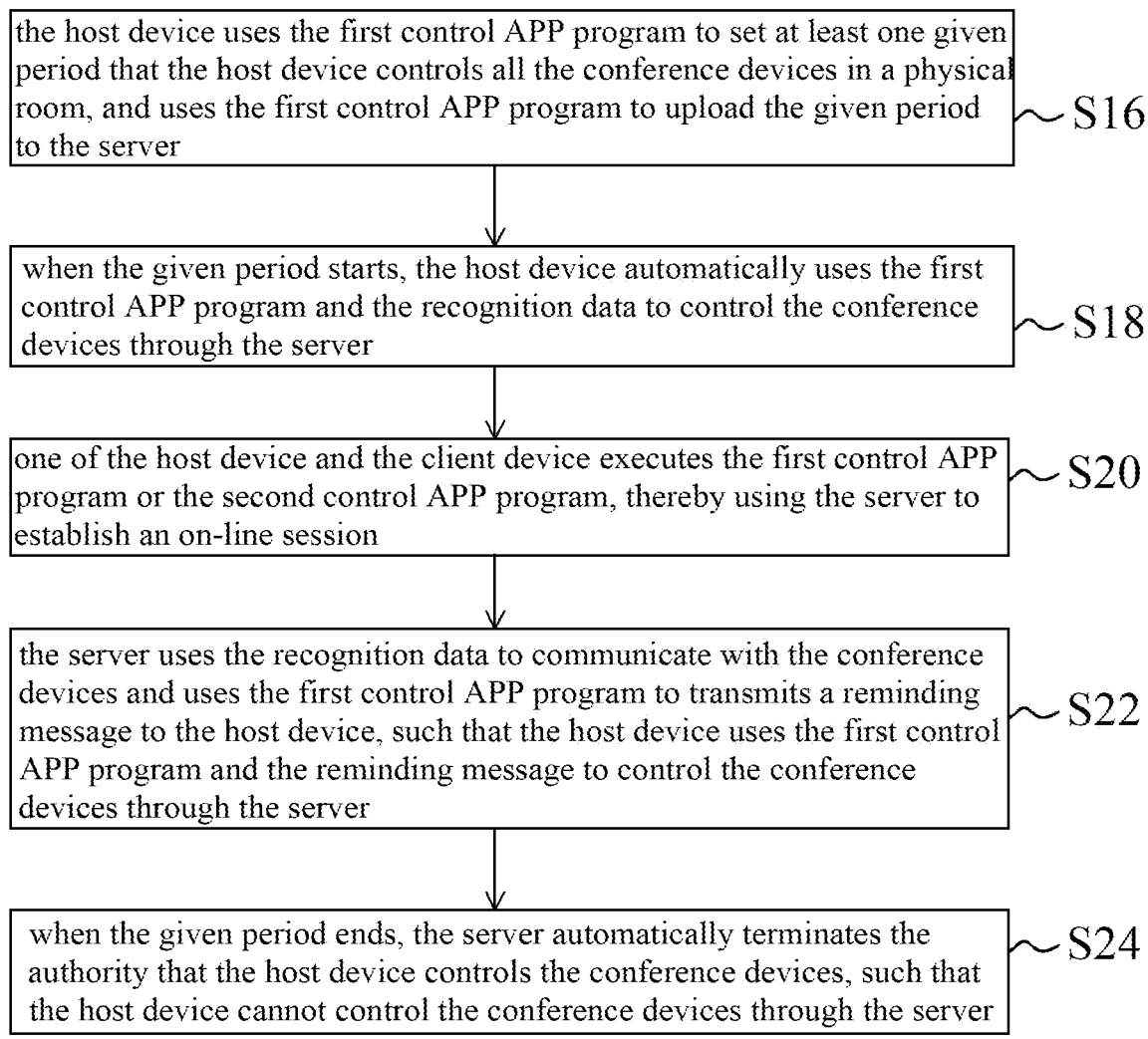
FIG. 4 is a flowchart of operating a third-party system for controlling conference equipment according to the second embodiment of the present invention.

Refer to FIG. 3 and FIG. 4. The flowchart of operating a third-party system for controlling conference equipment of the second embodiment of the present invention is introduced as follows. Firstly, in Step S16, the host device 14 uses the first control APP program to set at least one given period that the host device 14 controls all the conference devices 10 in a physical room, and uses the first control APP program to upload the given period to the server 12. Afterwards, in Step S18, when the given period starts, the host device 14 automatically uses the first control APP program and the recognition data to control the conference devices 10 through the server 12. Steps S16 and S18 are respectively the same to Steps S10 and S12. After Step S18, Step S20 is performed. In Step S20, one of the host device 14 and the client device 16 executes the first control APP program or the second control APP program, thereby using the server 12 to establish an on-line session. Then, in Step S22, the server 12 uses the recognition data to communicate with the conference devices 10 and uses the first control APP program to transmits a reminding message to the host device 14, such that the host device 14 uses the first control APP program and the reminding message to control the conference devices 10 through the server 12. Finally, in Step S24, when the given period ends, the server 12 automatically terminates the authority that the host device 14 controls the conference devices 10, such that the host device 14 cannot control the conference devices 10 through the server 12.

In Step S22, when the conference device 10 is an Internet protocol phone, the host device 14 uses the first control APP program and the reminding message to control the Internet protocol phone to answer a call, hold a call, transfer a call, or end a call through the server 12, such that the meeting is successfully held or terminated.

In conclusion, the present invention uses the host device to wirelessly control the conference device, such that a meeting is successfully held or terminated on time.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A third-party system for controlling conference equipment, comprising:
   at least one conference audio-visual device, arranged in a physical room, corresponding to at least one recognition datum, and the at least one recognition datum corresponds to a physical position of the physical room;
   at least one server, signally connected to the at least one conference audio-visual device, storing the at least one recognition datum; and
   at least one host device, wirelessly connected to the at least one server, storing the at least one recognition datum and having at least one first control application program built therein, the at least one first control application program corresponds to the at least one server, the at least one host device uses the at least one first control application program to set at least one given period to the server;
   wherein when the at least one given period starts, the at least one host device uses the at least one first control application program and the at least one recognition datum to control the at least one conference audio-visual device through the at least one server during the at least one given period;
   wherein when the at least one given period ends, the at least one server terminates authority that the at least one host device controls the at least one conference audio-visual device and the at least one host device cannot control the at least one conference audio-visual device through the at least one server;
   wherein after the at least one host device uses the at least one first control application program to send out an operating command to the at least one server, the at least one server transmits an operating signal to the at least one conference audio-visual device according to the operating command, and the at least one conference audio-visual device passively responds to the operating signal.

2. The third-party system for controlling conference equipment according to claim 1, wherein the at least one conference audio-visual device is a webcam, a liquid crystal display, or an Internet protocol phone.

3. The third-party system for controlling conference equipment according to claim 1, wherein the at least one recognition datum further comprises at least one of a telephone number, an Internet protocol address, a password, a recognition code, and a device name.

4. The third-party system for controlling conference equipment according to claim 1, wherein the at least one conference audio-visual device further comprises a plurality of conference audio-visual devices, the at least one server has an instruction set for controlling the plurality of conference audio-visual devices, the instruction set comprises a plurality of operation commands respectively corresponding to the plurality of conference audio-visual devices, after the at least one host device uses the at least one first control application program to send out a control command to the at least one server, the at least one server finds one of the plurality of operation commands corresponding to the control command from the instruction set and transmits it to a corresponding conference audio-visual device of the plurality of conference audio-visual devices, so as to control the corresponding conference audio-visual device.

5. The third-party system for controlling conference equipment according to claim 4, wherein after the at least one server transmits one of the plurality of operation commands corresponding to the control command to the corresponding conference audio-visual device to control the corresponding conference audio-visual device, one of the plurality of conference audio-visual devices corresponding to the control command uses the at least one server and the at least one first control application program to transmit a status message to the at least one host device to inform the at least one host device of a status of one of the plurality of conference audio-visual devices corresponding to the control command.

6. The third-party system for controlling conference equipment according to claim 5, wherein the at least one host device displays the status message.

7. The third-party system for controlling conference equipment according to claim 1, wherein the at least one first control application program has at least one independent control interface or an integrated control interface.

8. The third-party system for controlling conference equipment according to claim 1, wherein the at least one host device uses the at least one first control application program to upload the at least one given period to the at least one server.

9. The third-party system for controlling conference equipment according to claim 1, wherein the at least one server is connected to the at least one conference audio-visual device in a wired way or a wireless way.

10. The third-party system for controlling conference equipment according to claim 1, further comprising at least one client device wirelessly connected to the at least one server, the at least one client device has a second control application program built therein corresponding to the at least one server, one of the at least one host device and the at least one client device executes the at least one first control application program or the second control application program, thereby using the at least one server to establish an on-line session that corresponds to a virtual number, and when the at least one server uses the virtual number to attend the on-line session and communicate with the at least one server during the at least one given period, the at least one server uses the at least one recognition datum to communicate with the at least one conference audio-visual device and uses the at least one first control application program to transmits a reminding message to the at least one host device.

11. The third-party system for controlling conference equipment according to claim 10, wherein the at least one host device and the at least one client device are selected from smart phones, tablet computers, or notebook computers.

* * * * *